(12) United States Patent
Miner (10) Patent No.: US 11,453,458 B2
(45) Date of Patent: Sep. 27, 2022

(54) CYCLE FRAMES

(71) Applicant: Rodney Russell Miner, Kellogg, ID (US)

(72) Inventor: Rodney Russell Miner, Kellogg, ID (US)

( * ) Notice: Subject to any disclaimer, the term of this patent is extended or adjusted under 35 U.S.C. 154(b) by 480 days.

(21) Appl. No.: 16/545,936

(22) Filed: Aug. 20, 2019

(65) Prior Publication Data

US 2021/0053649 A1  Feb. 25, 2021

(51) Int. Cl.
*B62K 19/24* (2006.01)
*B62K 19/32* (2006.01)
*B62J 7/06* (2006.01)
*B62J 7/04* (2006.01)
*B62K 19/36* (2006.01)

(52) U.S. Cl.
CPC .............. *B62K 19/24* (2013.01); *B62J 7/04* (2013.01); *B62J 7/06* (2013.01); *B62K 19/32* (2013.01); *B62K 19/36* (2013.01)

(58) Field of Classification Search
CPC .......... B62K 7/02; B62K 19/10; B62K 19/24; B62K 19/18; B62K 19/32; B62K 19/36; B62J 7/04; B62J 7/06
See application file for complete search history.

(56) References Cited

U.S. PATENT DOCUMENTS

| 4,613,146 | A | * | 9/1986 | Sharp | ........................ | B62K 3/02 |
| | | | | | | 280/288.2 |
| 5,794,958 | A | * | 8/1998 | Hsiao | .................... | B62K 15/006 |
| | | | | | | 280/278 |
| 6,139,038 | A | * | 10/2000 | Santa Cruz | .............. | B62K 3/10 |
| | | | | | | 280/274 |
| 8,128,113 | B2 | * | 3/2012 | Fioravanti | .............. | B62K 19/24 |
| | | | | | | 280/281.1 |
| 9,248,880 | B2 | * | 2/2016 | Haimoff | .................. | B62K 19/10 |
| 9,434,441 | B1 | * | 9/2016 | Sand | ....................... | B62K 19/32 |
| 9,604,688 | B1 | * | 3/2017 | Yang | ........................... | B62J 1/04 |
| 9,963,188 | B2 | * | 5/2018 | Gauthier | ................. | B62K 19/32 |
| 10,053,179 | B2 | * | 8/2018 | Xie | ......................... | B62K 11/14 |
| 10,351,200 | B2 | * | 7/2019 | Moore | .................... | B62K 19/08 |
| 2009/0146391 | A1 | * | 6/2009 | Sutherland | ............. | B62K 19/08 |
| | | | | | | 280/287 |
| 2012/0013101 | A1 | * | 1/2012 | Huang | ................... | B62K 19/08 |
| | | | | | | 280/287 |
| 2017/0327174 | A1 | * | 11/2017 | Moore | ................... | B62K 19/16 |

\* cited by examiner

*Primary Examiner* — Tony H Winner
*Assistant Examiner* — Michael R Stabley (57) ABSTRACT

A cycle frame may include a first set of plates and a plurality of frame beams attached between the first set of plates using removable fasteners.

20 Claims, 8 Drawing Sheets

CYCLE FRAMES

BACKGROUND

Cycles can be used, at times, for recreation, transportation and/or to assist in transporting goods, among other things. Cycles can be made up of frame portions, components, and one or more wheels.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Cycles (e.g., vehicles such as bicycles, motorcycles, tricycles, quadricycles, etc.) tend to have a relatively static structure. For example, a given cycle frame tends to be fixidly assembled (e.g., welded together) such that individual frame beams may not be disassembled and/or reassembled in different orientations and/or combinations. Using the example of a typical bicycle frame to illustrate, the angle between the top tube and the down tube may not be adjustable as the top and down tubes may be welded together (or to different intermediate components, such as the head tube, by way of example. Consequently, a typical cycle frame may be suited for but one use, rider body type, etc. For instance, a bicycle frame designed and built for a road bike (and of a certain size) may not be suitable for riders outside of the bike's specification (e.g., a 23" bicycle frame may be unsatisfactory for a 6'10" rider) and also may not be suitable for certain activities (e.g., off-road biking). It will be appreciated that the static nature of cycle frames can make ownership of cycles for different uses and purposes costly and the resulting cycles may occupy considerable space. There may be a desire, therefore, for a cycle capable of being used in different ways and by users of different sizes.

Figure 1A:
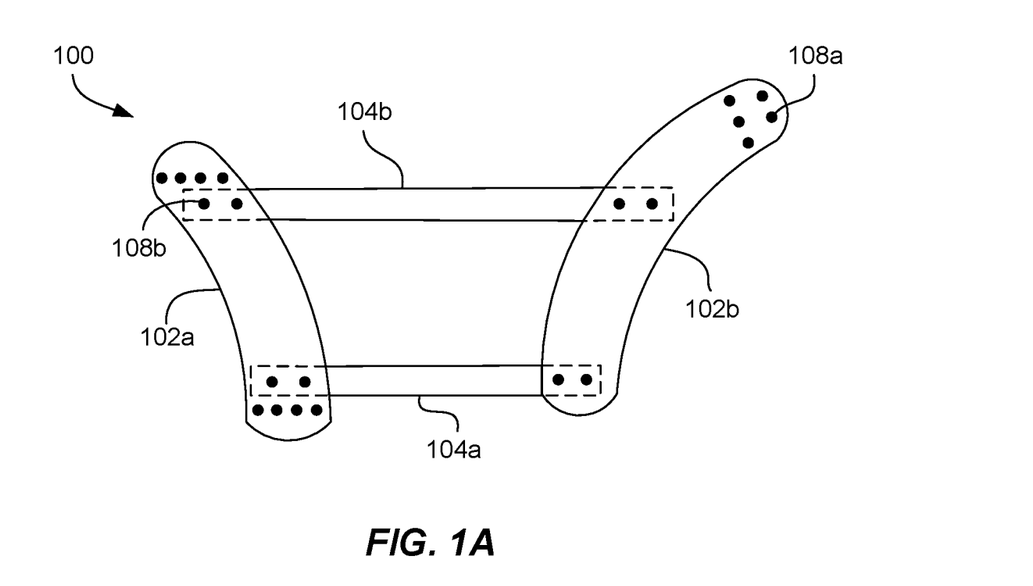
FIGS. 1A and 1B are views of an example cycle frame.
Figure 1B:
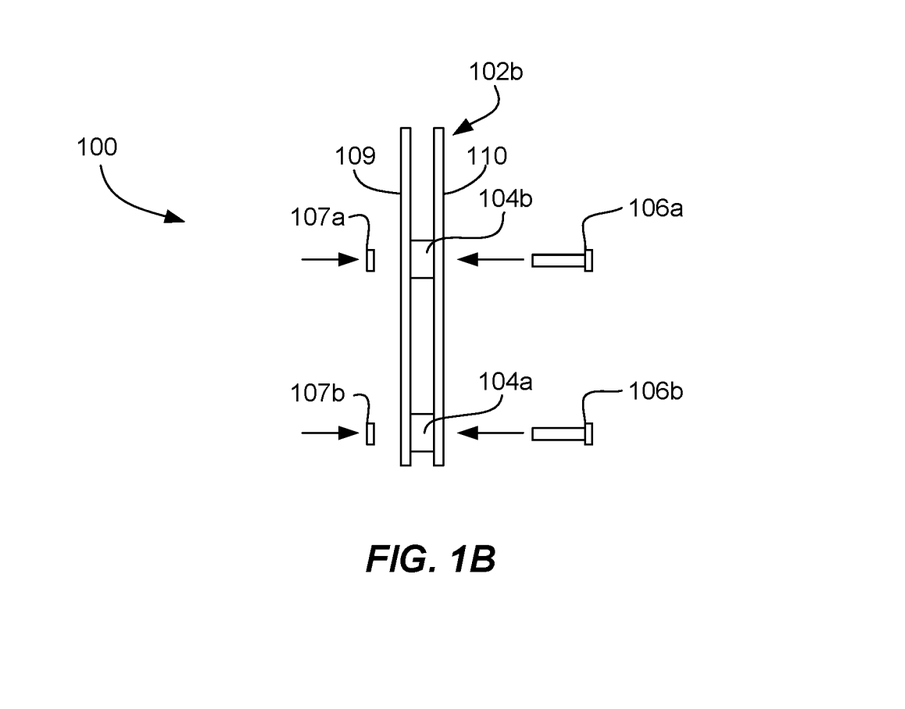

One approach may include the use of an adaptable or modular cycle frame. For example, the cycle frame may be made up of a set of plates between which frame beams may be secured, such as using removable fasteners. Using such an approach, it may be possible to use a cycle frame in one arrangement (e.g., with cycle components arranged to form a recumbent cycle) to commute, and subsequently the cycle frame may be reconfigured into a fat tire cycle suitable for off-road operation, or a tandem cycle configuration suitable for allowing two users to use the cycle concurrently, etc. FIGS. 1A and 1B illustrate an example cycle frame 100. As should be appreciated, this example is provided merely by way of illustration and is not to be taken in a limiting sense.

FIG. 1A is a side view of a simplified example cycle frame 100. FIG. 1B is a front view of the example cycle frame 100, with the set of plates 102b in front. As shown, a cycle frame, such as cycle frame 100, may include a number of sets of plates, such as illustrated by the sets of plates 102a and 102b.

Each set of plates may be made up of a first plate and a second plate, such as first plate 109 and a second plate 110 of set of plates 102b shown in FIG. 1B. It is to be understood that reference to sets of plates herein includes individual plates, such as first plate 109 and second plate 110. In some cases, the sets of plates may be substantially parallel in arrangement and structure, as shown in FIGS. 1A and 1B. But in other cases the set of plates may have non-planar surfaces, may be arranged at non-parallel angles with respect to each other, etc.

Between the set of plates, such as set of plates 102b, cycle components and/or frame members may be arranged and secured. For example, FIGS. 1A and 1B show frame beams 104a and 104b arranged between set of plates 102a and set of plates 102b. Portions of frame beams 104a and 104b arranged behind plates are illustrated with dotted lines to illustrate that those portions may be obscured behind sets of plates 102a and/or 102b. Set of plates 102b also shows apertures (of which aperture 108a is an example) for securing frame beams and cycle components. For instance, a handlebar component (e.g., comprising a head tube, a headset, and a handlebar, by way of example) can be secured to cycle frame 100.

A number of fasteners, such as example fasteners 106a and 106b may be used to secure cycle components and frame members between sets of plates. In some cases, fastener components, such as example fastener components 107a and 107b may be used in combination with fasteners 106a and 106b to secure frame beams and components. Reference to fasteners herein are intended to cover implementations with or without fastener components. Fasteners, such as fasteners 106a and 106b, may be removable, such as to enable altering an arrangement of frame members, cycle components, and sets of plates. Example fasteners may include screws, bolts, quick release levers (e.g., longer versions such as used to secure cycle wheels to a frame, or shorter versions such as used on seat post extensions), spring clips, snap buttons, button clips, etc. And example fastener components may include nuts and other like structures for securing fasteners (e.g., may be threaded, etc.). It is to be understood that the example fasteners 106a and 106b and fastener components 107*a* and 107*b* are provided merely by way of illustration, and a number of other fasteners may be used without straying from claimed subject matter.

In operation, a set of plates (e.g., set of plates 102*a* or set of plates 102*b*) may be used in conjunction with a number of frame beams (e.g., frame beams 104*a* and 104*b*), such as with the frame beams attached between individual plates of the set of plates, using removable fasteners (e.g., removable fasteners 106*a* and 106*b*). A number of sets of plates may be used (e.g., two sets of plates, three sets of plates, and more, etc.). And the number of frame beams may include (but not be limited to) two frame beams, three frame beams, and more, etc. It should be understood that in such an arrangement, it may be possible to provide a cycle frame that may be adaptable, such as adaptable to take different structural forms and/or sizes, and thus may be used by different riders and used for different purposes.

The set of plates may comprise substantially parallel plates, such as shown in FIGS. 1A and 1B. In other cases, however, the plates of the set of plates may be at least partially non-planar in form and/or may be arranged to be at least partially non-parallel with respect to each other.

Adapting the cycle frame (e.g., cycle frame 100) may be possible by a set of plates (e.g., sets of plates 102*a* and/or 102*b*) that may comprise a plurality of apertures (e.g., apertures 108*a* and/or 108*b*), the apertures corresponding to apertures in frame beams (e.g., frame beams 104*a* or 104*b*) and/or corresponding to apertures in mounting components, such as brackets for retaining different cycle components (e.g., brackets to receive a storage component, etc.). In one case, a set of plates may have a first set of apertures corresponding to a first configuration (e.g., a standard configuration), a second set of apertures corresponding to a second configuration (e.g., a recumbent configuration), etc. In such a case, then, the plurality apertures of the set of plates may be arranged to attach a plurality of frame beams at a plurality of different angles with respect to each other (e.g., compare FIG. 1A and FIG. 3F). In another embodiment, however, different sets of plates may be used for different configurations. For instance, a first set of plates may be used for a first configuration (e.g., a standard cycle configuration), a second set of plates may be used for a second configuration (e.g., a recumbent configuration), etc.

Figure 2:
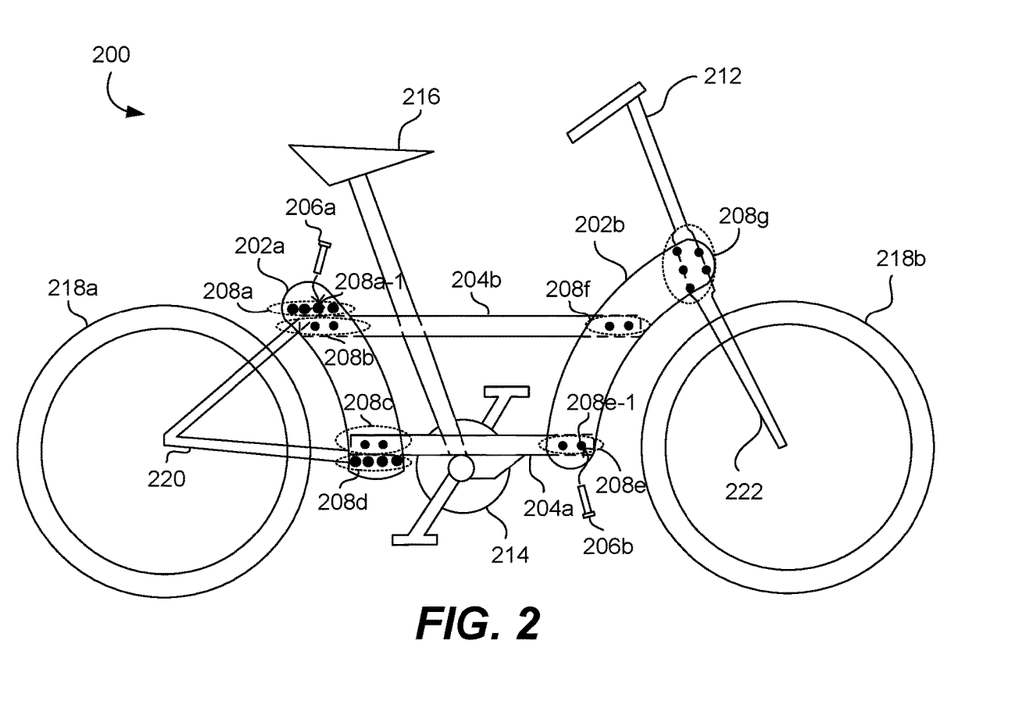
FIG. 2 is a simplified illustration of an example cycle frame in an upright configuration.

FIG. 2 illustrates an example cycle frame 200 in a simplified form with additional example components, such as wheels (e.g., wheels 218*a* and 218*b*), a seat component (e.g., seat component 216), a crank component (e.g., crank component 214), and a handlebar component (e.g., handlebar component 212). As was noted above, such a cycle configuration may be suited for particular riders and/or particular uses, but there may be a desire to adapt the cycle frame for different riders and/or uses, as shall be discussed in greater detail hereinafter with reference to FIGS. 3A-3I, which illustrate a number of possible cycle frame configurations. It is noted that FIG. 2 includes element numbers (e.g., 200, 202, 204, etc.) that may correspond (e.g., x00 may correspond to 100, x02 may correspond to 102, etc.) to element numbers of FIG. 1. Such use of numbering is used to indicate similar components (e.g., a first set of plates 102*a* in FIG. 1 may be similar to a first set of plates 202*a* in FIG. 2). As such, it is intended that previous description of elements may be applicable to later similar elements (unless explicitly stated otherwise), and unnecessary repetition of element description may be avoided. This approach is taken throughout the detailed description thus allowing description of successive figures to build upon each other and help avoid unnecessary repetition.

Returning to FIG. 2, an example cycle frame 200 illustrates a first set of plates 202*a* and a second set of plates 202*b* (which may be similar to first set of plates 102*a* and second set of plates 202*b* in structure and/or operation). As illustrated, in one implementation, the first and the second set of plates 202*a* and 202*b* may have a shape that may correspond to a shape of a wheel. Said otherwise, the first and the second set of plates 202*a* and 202*b* may have a curve corresponding substantially with a curve of a wheel of a cycle. However, as will be apparent by reviewing the example cycle frames of FIGS. 3A-3I, this may not always be the case.

A first frame beam 204*a* and a second frame beam 204*b* may be similar to first frame beam 104*a* and 104*b* in structure and/or operation and may be arranged between, or sandwiched between, the first and the second set of plates 202*a* and 202*b*. For example, ends of first frame beam 204*a* may be secured between individual plates of first set of plates 202*a* to align apertures of first frame beam 204*a* with apertures of first set of plates 202*a*. And removable fasteners may be inserted into the aligned apertures. It is noted that the drawings intentionally do not distinguish between the respective apertures of frame beams and plates. This is because while aligned, the apertures of both the former and latter are represented by a same drawing element. Thus, for example, an example aperture 208*e*-1 may represent an aperture of both first frame beam 204*a* and second set of plates 202*b*. An example removable fastener 206*b* is also illustrated as being inserted into example aperture 208*e*-1. Use of a number of fasteners, such as removable fasteners 206*a* and 206*b*, may enable altering a structure, size, and/or use of cycle frame 200.

FIG. 2 illustrates a number of apertures grouped as shown using ovals with broken lines. For instance, a first set of apertures 208*a* is illustrated having an example aperture 208*a*-1 through which a fastener 206*a* may pass to connect set of plates 202*a* to stay component 220. A second set of apertures 208*b* may be usable to connect set of plates 202*a* to frame beam 204*b*. A third set of apertures 208*c* may be usable to connect set of plates 202*a* to frame beam 204*a*. A fourth set of apertures 208*d* may be usable to also connect set of plates 202*a* to stay component 220. A fifth set of apertures 208*e* may be usable to connect set of plates 202*b* to frame beam 204*a*. An example aperture 208*e*-1 is illustrated to show how example fastener 206*b* may be used to connect set of plates 202*b* to frame beam 204*a*. A sixth set of apertures 208*f* may be usable to connect set of plates 202*b* to frame beam 204*b*. A seventh set of apertures 208*g* may be usable to connect handlebar component 212 to set of plates 202*b*. Of course, this is but one example and the present description contemplates other combinations of structural parts (e.g., sets of plates, frame beams, etc.), components, apertures, and/or fasteners.

Sets of plates 202*a* and 202*b* may have additional sets of apertures, such as to enable different configurations of components. For examples, sets of plates 202*a* and 202*b* may have sets of apertures at different angles (see e.g., FIG. 3A). To illustrate, a handlebar component may be installed at a first angle in a first configuration and a second angle in a second configuration. And as such, sets of apertures may be provided to accommodate those different configurations. In another example, a stay member (e.g., stay member 220) may be different sizes, such as based on wheel size. Thus, a set of plates (e.g., set of plates 202*a*) may have different sets of apertures to accommodate the different stay member sizes.

The sets of apertures may therefore allow a number of cycle components to be attached to cycle frame 200. For example, a seat component 216 may be attached to cycle frame 200. The example cycle frame 200 shows seat component 216 attached to first frame beam 204a and/or second frame beam 204b. Additional components include (but are not limited to) a handlebar component (e.g., handlebar component 212), a crank component (e.g., crank component 214), components for wheels (e.g., wheels 218a and 218b and stay component 220 and fork component 222), etc. For instance, example cycle frame 200 shows handlebar component 212 attached to set of plates 202b; cycle frame 200 shows a crank component 214 connected to first frame beam 204a; cycle frame 200 also shows components for connecting wheels 218a and 218b to cycle frame 200 (e.g., stay component 220 and fork component 222). Of course, these are but examples, and different cycle components may be connected to different portions of a cycle frame, including attaching to intermediary components, such as brackets and other mounting components, which may in turn be connected to plates and/or frame beams, without limitation.

Thus, in operation, a cycle frame (e.g., example cycle frame 200) may have a first set of plates and a second set of plates (e.g., sets of plates 202a and 202b). And the first set of plates (e.g., set of plates 202b) may be arranged to receive a handlebar component (e.g., handlebar component 212). The cycle frame may have a plurality of frame beams comprising a first frame beam (e.g., frame beam 204a) and a second frame beam (e.g., frame beam 204b). The first and second frame beams may be received between the second set of plates (e.g., set of plates 202a). A crank component (e.g., crank component 214) and a seat component (e.g., seat component 216) may be connected to the second set of plates, the first frame beam, the second frame beam, or a combination thereof. For example, the seat component may be attached to the first frame beam and/or the second frame beam. The crank component may be connected to the first frame beam. A first wheel (e.g., wheel 218a) may be connected to the first set of plates and a second wheel (e.g., wheel 218b) may be connected to the second set of plates (e.g., via stay component 220 and fork component 222). The different components of the cycle frame may be connected using a plurality of removable fasteners (e.g., example fasteners 206a and 206b).

Turning now to FIGS. 3A-3I, a number of possible cycle frame configurations are illustrated. It is to be understood that these configurations are provided merely by way of illustration and are not to be taken in a limiting sense. This small subset of possible configurations is presented merely to illustrate the adaptability of a cycle frame consistent with claimed subject matter. It is noted that similar element numbers are used to refer to similar components. For instance, when referring to a cargo frame component, an element number 324 may be used in different drawings. And in some drawings only a single element may be shown (e.g., cargo frame component 324 in FIG. 3C) while multiple similar elements may be shown in other implementations (e.g., cargo frame components 324a and 324b in FIG. 3A). To avoid confusion, general reference to elements or components may be used (e.g., a cargo frame component 324) and may be relevant to all occurrences of that element in the different implementations illustrated in FIGS. 3A-3I. However, when there is a desire to draw attention to a particular element, the specification will refer to the particular drawing (e.g., FIG. 3A) and/or to the particular implementation (e.g., cycle frame 300a).

It is also noted that the elements and components discussed with regards to the implementations illustrated in FIGS. 3A-3I may be similar to those components discussed previously with regards to FIGS. 1A, 1B, and 2. For instance, a first set of plates 302a may be similar to a first set of plates 202a illustrated in FIG. 2 and a first set of plates 102a illustrated in FIGS. 1A and 1B. As noted previously, this is done to avoid unnecessary duplication of description. Thus, unless explicitly stated otherwise, structure and operation of a cycle frame (e.g., cycle frame 300), sets of plates (e.g., sets of plates 302), a frame beam (e.g., frame beam 304), a removable fastener, a fastener component, apertures, an individual plate of a set of plates, a handlebar component (e.g., handlebar component 312), a crank component (e.g., crank component 314), a seat component (e.g., seat component 316), a wheel (e.g., wheel 318), a stay component (e.g., stay component 320), a fork component (e.g., fork component 322), etc. may be assumed to be similar to that of corresponding elements and components already discussed in relation to FIGS. 1A, 1B, and 2. It is noted that to reduce the number of elements illustrated (and make the drawings more clear) some claim elements are not shown in some cases (e.g., fasteners, fastener components, apertures, individual plates, etc.). However, this is not done to limit the relevance of these elements to the implementations of FIGS. 3A-3I.

Figure 3A:
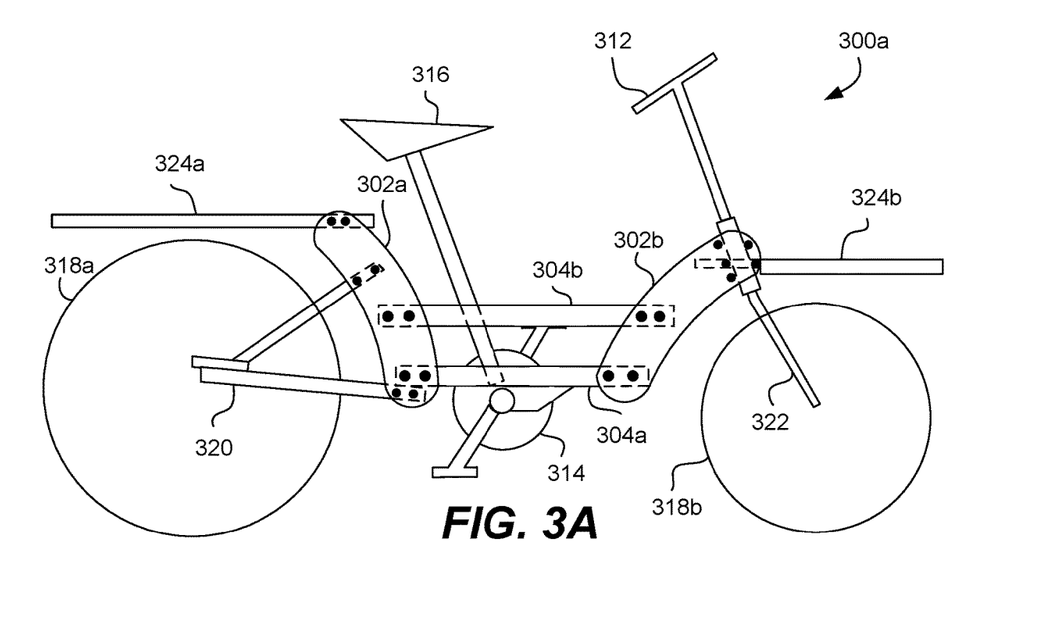
FIGS. 3A-3I are simplified views of example cycle frames.

FIG. 3A illustrates a cycle frame configuration for cycle frame 300a. In this configuration, attention is drawn to the use of cargo frame components 324a and 324b, which are illustrated as being connected to set of plates 302a and set of plates 302b, respectively. It is noted that in other cases, cargo frame components (e.g., cargo frame components 324) could take a number of different forms. For instance, in some cases cargo frame components could be integrated with frame beams (see e.g., FIGS. 3D and 3E) but in other cases, cargo frame components could be distinct from frame beams (e.g., FIG. 3A). At times, cargo frame components could include a tray, at other times, cargo frame components could be more basket-like. For instance, there may be components on the sides (e.g., walls) and/or top and/or bottom (e.g., lids and/or bases) of the cargo frame components. The cargo frame components may be made up of wires, tubes (circular or otherwise), solid portions, metals, plastics, etc.

Example cycle frame 300a also illustrates an implementation in which wheels 318a and 318b are not the same size. Wheel size selection may be made based on rider size and/or desired cycle use, by way of example. In the case of cycle frame 300a, a smaller front wheel may be desirable, such as to allow cargo frame component 324b to accommodate larger items without obscuring a field of view of a rider. Of course, other considerations may be taken into account when altering a cycle frame configuration.

Figure 3B:
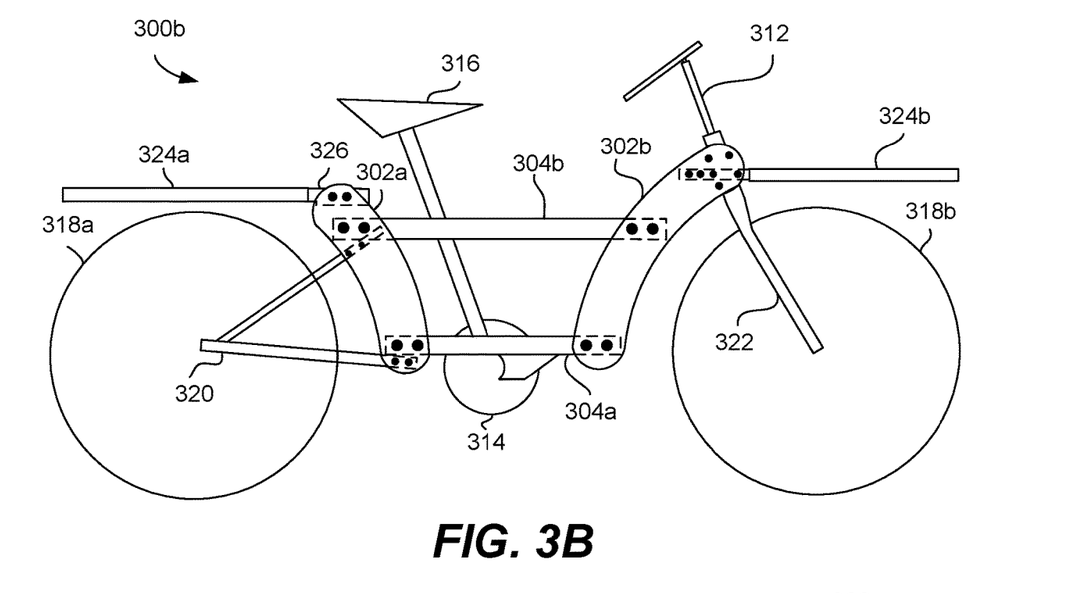

In contrast, example cycle frame 300b of FIG. 3B illustrates an implementation, similar to that of example cycle frame 300a, but with wheels 318a and 318b having a similar size. As noted, while size and selection may be made based on rider size and intended cycle use among other things.

Additionally, cycle frame 300b shows a bracket component 326 to which cargo frame component 324a may be connected. In some cases, bracket components, such as bracket component 326, may be attached to sets of plates and/or frame beams in order to facilitate the connection of cycle components to a cycle frame. For instance, a bracket component may be used to facilitate attachment of a seat component to a cycle frame. In another example, a bracket component may be used to facilitate attachment of a crank component to a cycle frame. Etc.

Bracket components, such as bracket component 326, may take a number of forms. For instance, bracket component 326 may have a profile to correspond to an attachment portion of cargo frame component 324a. For instance, if an approximately square tube is used to attach cargo frame component 324a to cycle frame 300b, then bracket component 326 may have a profile to correspond to that approximately square tube and secure the square tube therein. It is noted that in addition to the elements discussed in the preceding paragraphs, other elements, such as seat component 316, handlebar component 312, sets of plates 302, frame beams 304, crank component 314, stay component 320, and for component 322 may be similar to similar elements discussed previously.

Figure 3C:
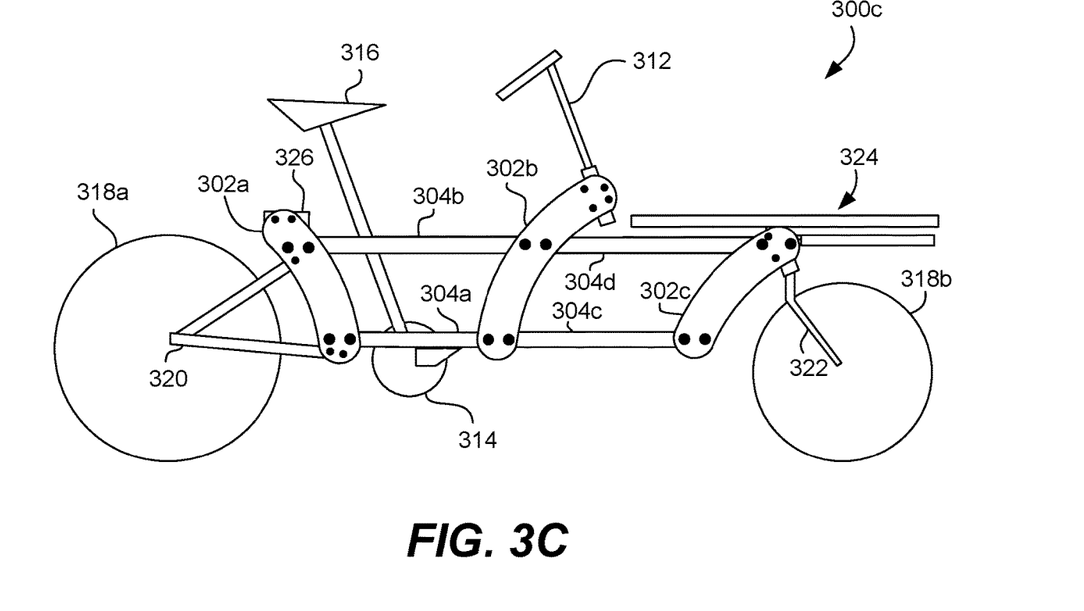

Moving on to FIG. 3C, yet another cycle frame implementation is shown by example cycle frame 300c. Cycle frame 300c illustrates a configuration in which a front wheel 318b and a fork component 322 are connected to a third set of plates 302c while handlebar component 312 is connected to a second set of plates 302b. In such implementations, there may be some form of linkage to allow adjustments at handlebar component 312 to translate to fork component 322 (e.g., a mechanical linkage).

Also, as illustrated, cargo frame component 324 may include multiple frame beams. As should be appreciated, such configurations of cargo frame component 324 may be desirable, such as for configuring a cycle frame to carry different types, shapes, sizes, etc. of cargo.

FIG. 3C also illustrates bracket component 326 without an attached component. Yet another difference is that frame members are shown that may potentially extend through (as opposed to terminating at) a set of plates, in this case, second set of plates 302b. However, in some cases, rather than continuous frame beams, multiple frame beams, such as frame beams 304a-304d may be used in combination. For instance, in one case, frame beams 304c and 304d may connect to frame beams 304a and 304b, respectively. In some such embodiments, intermediate bracket components may be used to enable connection of frame beams. It is noted that, in addition to those elements discussed in the present paragraph, other elements, such as seat component 316, a set of plates 302a, a wheel 318a, a stay component 320, and a crank component 314 may be similar to elements discussed previously.

Figure 3D:
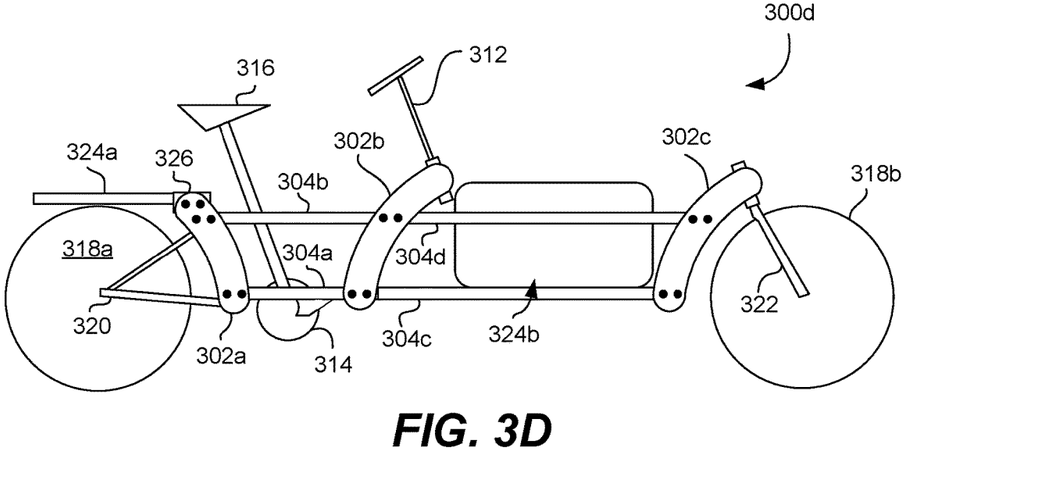

FIG. 3D illustrates a configuration of cycle frame 300d that includes three sets of plates, similar to cycle frame 300c, but with a different form of cargo frame component, cargo frame component 324b. Cargo frame component 324b could be part of frame beams 304c and 304d. For instance, frame beams 304c and/or 304d may not be straight, but may comprise a number of bends to define an opening and to allow reception and storage of cargo therein. It is noted that, in addition to elements discussed in the present paragraph, other elements, such as seat component 316, handlebar component 312, sets of plates 302, cargo frame component 324a, bracket component 326, frame beams 304, stay component 320, fork component 322, wheel 318a, and crank component 314 may be similar to similar elements discussed previously.

Figure 3E:
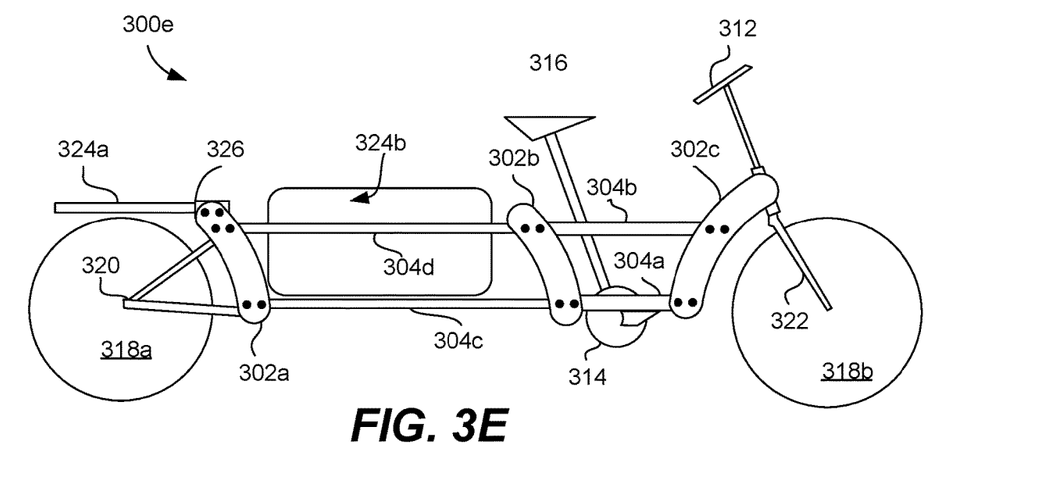

FIG. 3E illustrates of configuration of cycle frame 300e that includes a cargo frame component 324b structure similar to that of cycle frame 300d, but arranged behind seat component 316. It is noted that in addition to the elements discussed in this paragraph, other elements, such as seat component 316, handlebar component 312, sets of plates 302, cargo frame component 32, bracket component 326, frame beams 304, stay component 320, fork component 322, wheel 318a, crank component 314 may be similar to elements discussed previously.

Figure 3F:
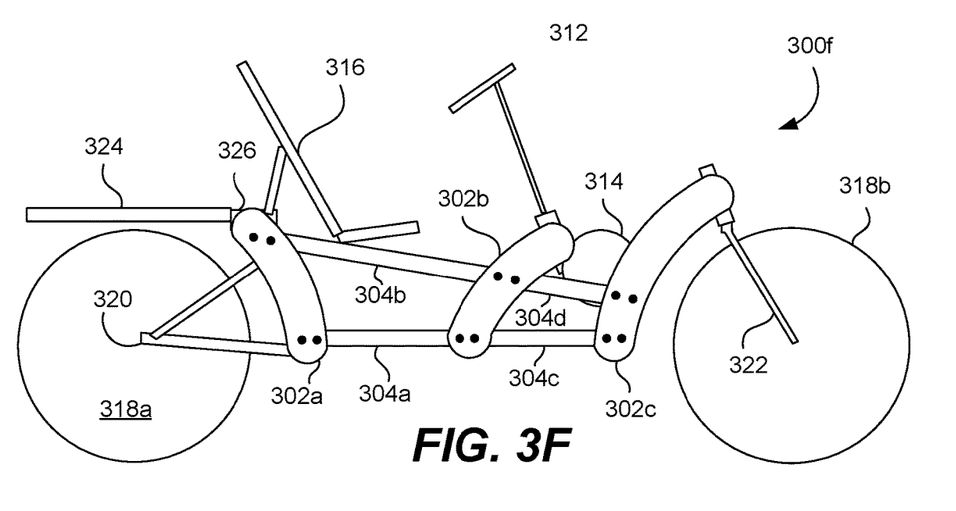

FIG. 3F illustrates an example cycle frame 300f in a recumbent configuration. As illustrated, crank component 314 may be connected to third set of plates 302c (e.g., via a bracket component). A seat component 316 may be different for this configuration. It is noted that in addition to the elements discussed in this paragraph, other elements, such as cargo frame component 324, bracket component 326, sets of plates 302, handlebar component 312, frame beams 304, stay component 320, fork component 322, wheels 318, and crank component 314 may be similar to elements discussed previously.

Figure 3G:
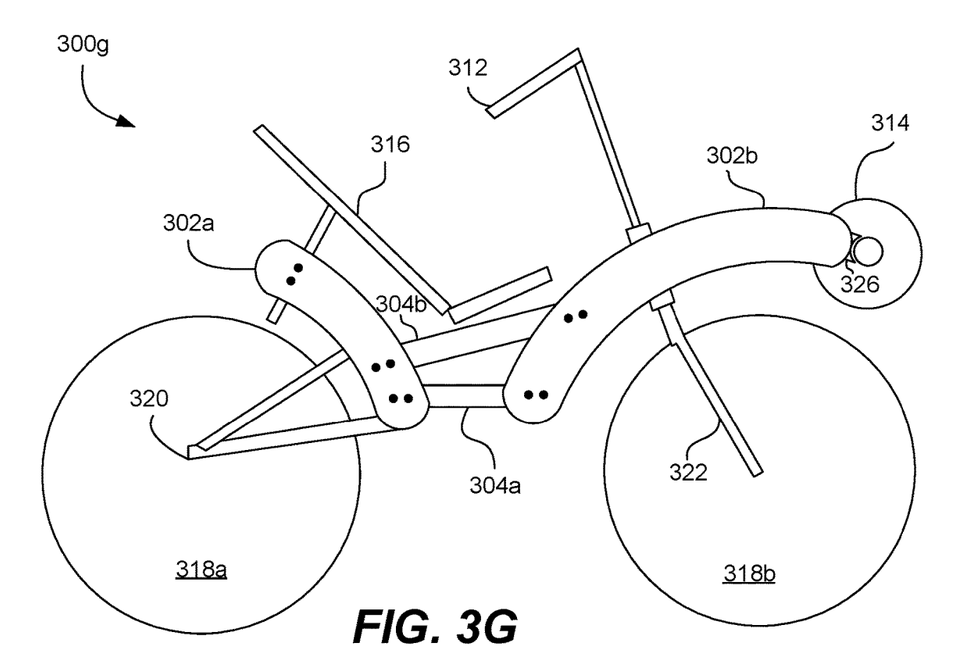

FIG. 3G illustrates another example cycle frame 300g in a recumbent configuration. In this case, only two sets of plates (plates 302a and 302b) are used rather than the three sets of plates in the recumbent configuration of cycle frame 300f. As such, crank component is connected at an extremity of second set of plates 302b using a bracket 326. It is noted that in addition to those elements discussed in this paragraph, other elements, such as seat component 316, handlebar component 312, stay component 320, fork component 322, wheels 318, and crank component 314 may be similar to elements discussed previously.

It is further noted that the frame beams (e.g. frame beams 304a and 304b) of cycle frame 300f and cycle frame 300g are arranged at an angle with respect to each other, rather than being substantially parallel, as shown in some preceding implementations.

Figure 3H:
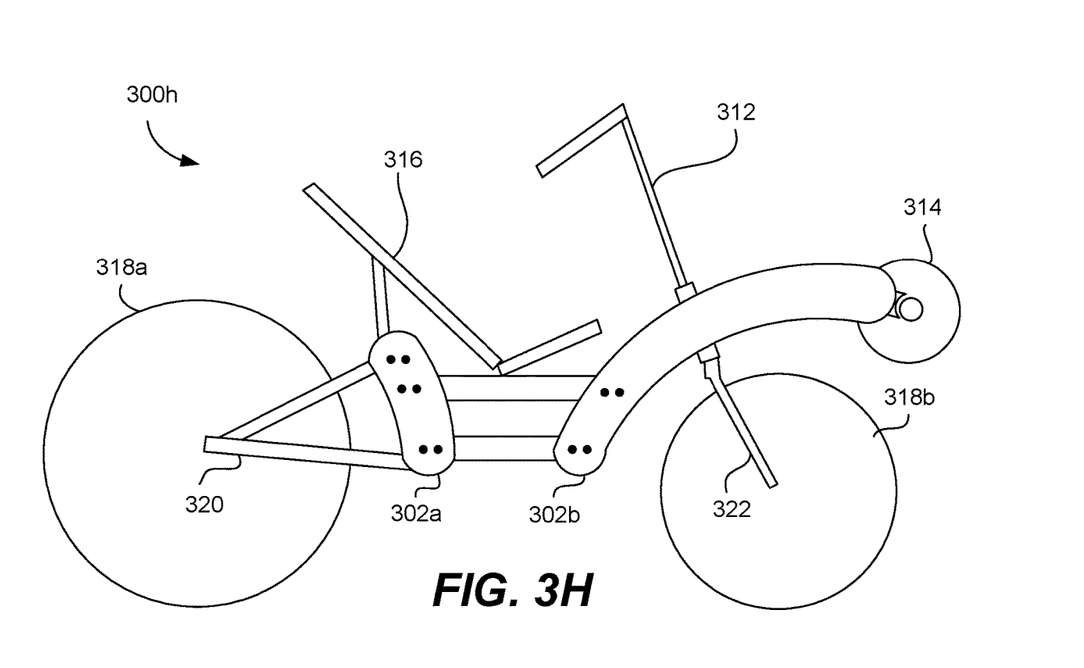

FIG. 3H illustrates another recumbent configuration in example cycle frame 300h. In this implementation, wheels 318a and 318b may be of different sizes. Additionally, it is noted that similar to the implementation of cycle frame 300g second set of plates 302b is longer than some sets of plates of preceding implementations. This may be of interest in the case of recumbent configurations, such as in order to move crank component 314 further from seat component 316. Also, due at least in part to this configuration, it is noted that the curvature of second set of plates 302b may not correspond to a curvature of wheel 318b. It is noted that other elements, such as sets of plates 302, handlebar component 312, stay component 320, fork component 322, wheels 318, and crank component 314 may be similar to elements discussed previously. It is noted that in addition to the elements discussed in this paragraph, other elements, such as set of plates 302a, handlebar component 312, stay component 320, and fork component 322 may be similar to elements discussed previously.

Figure 3I:
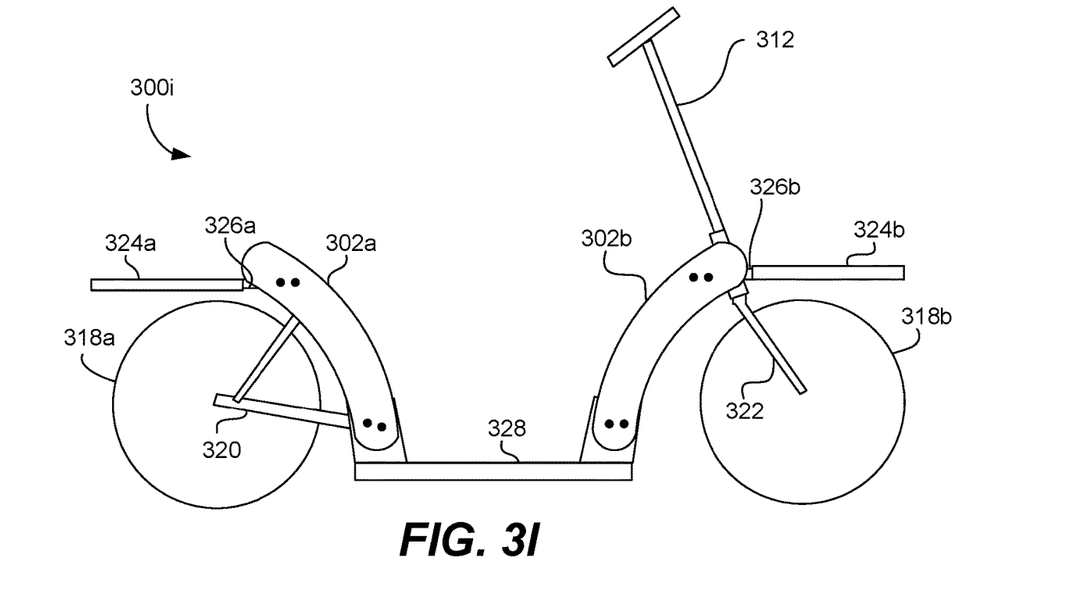

FIG. 3I illustrates an example cycle frame 300i in a scooter configuration. In this example, a foot component 328 may be used rather than a seat component. It is noted that in addition to the elements discussed in this paragraph, other elements, such as set of plates 302a, handlebar component 312, cargo frame components 324, bracket components 326, stay component 320, fork component 322, and wheels 318 may be similar to elements discussed previously.

It is noted that these examples are not intended to be read in a limiting sense and that any number of other cycle frame configurations may be used consistent with claim subject matter. Indeed, as should be appreciated, tandem and triplet configurations, trike configurations, quad configurations, and more can be supported using a plates and frame beams.

Figure 4:
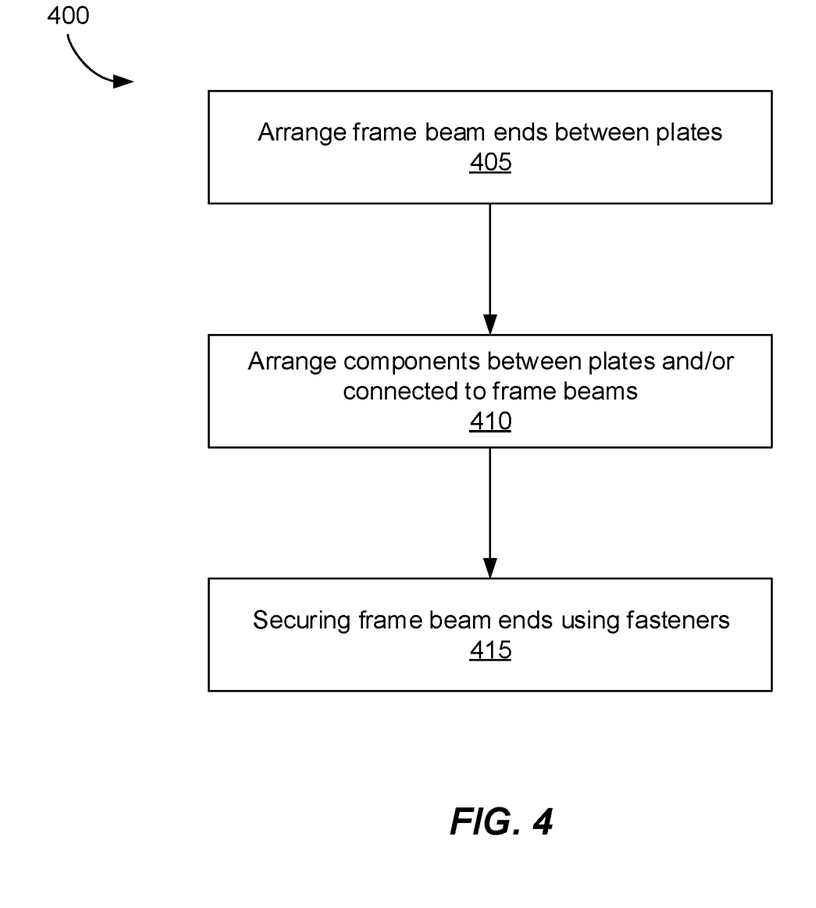
FIG. 4 is a flowchart for an example method.

With the following possible arrangements of components in mind, example method 400 of FIG. 4 is a flow diagram illustrating an approach for assembling components of a cycle frame. Reference will be made to example cycle frame 200 merely by way of illustration.

At block 405, a portion of a frame beam (e.g., frame beam 204a) is to be arranged between plates (e.g., set of plates 202b). For instance, an extremity or end of a frame beam may be sandwiched between individual ones of a set of plates. At block 410, components (e.g., handlebar component 212) may be arranged between plates and/or connected to frame beams. At block 415, fasteners (e.g., fastener 206a) may be used to secure frame beam ends, such as by passing the fasteners through apertures of a set of plates and frame beams.

Figure 5:
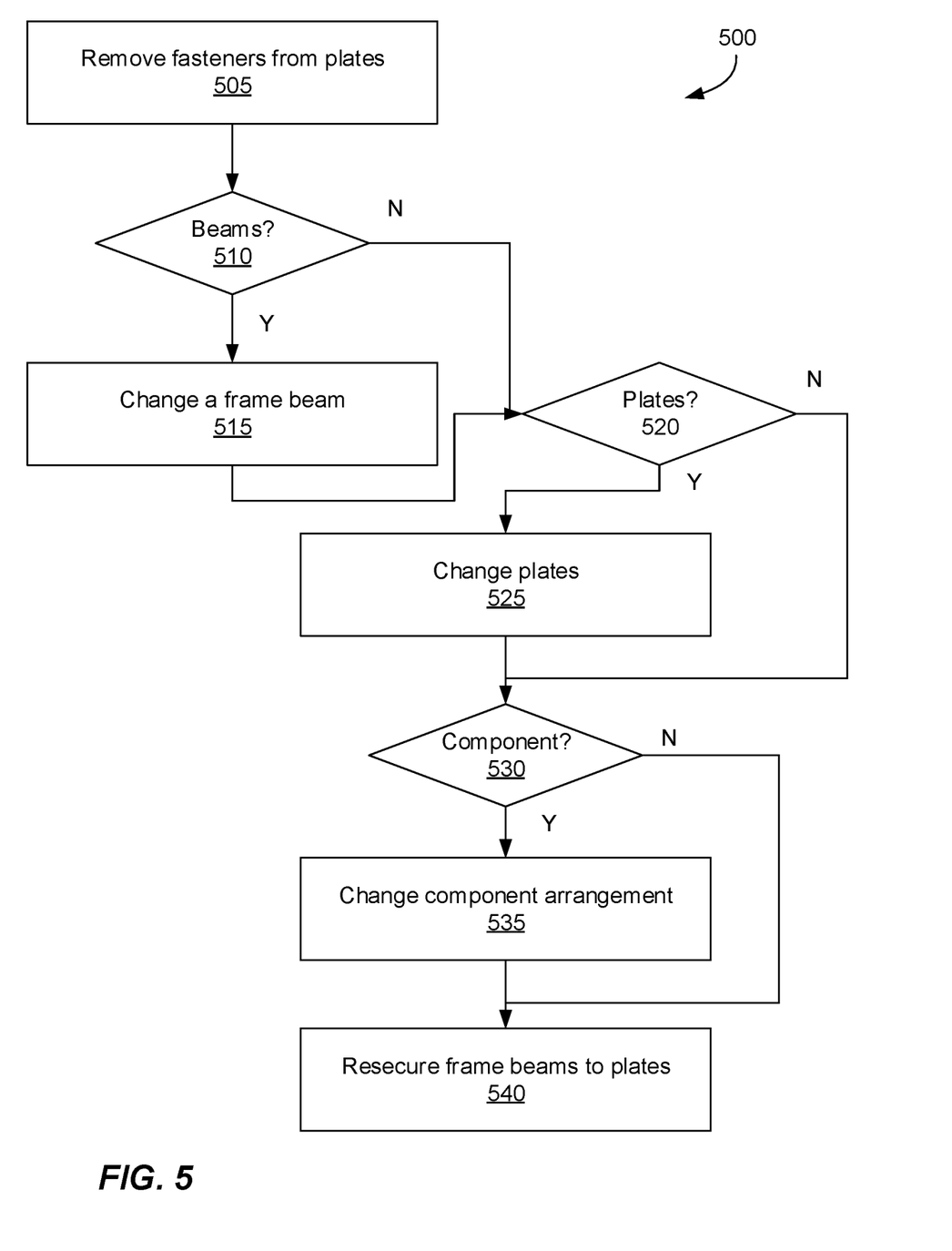
FIG. 5 is a flowchart for another example method.

As noted, one advantage of the present approach to a cycle frame is the ability to adapt the cycle frame for different users and/or uses. Example method 500 of FIG. 5 presents one approach for adapting a cycle frame. Again, reference will be made to example cycle frame 200 of FIG. 2 in describing method 500.

At block 505, fasteners (e.g., fasteners 206a and 206b) may be removed from plates (e.g., sets of plates 202a and 202b). At block 510, a determination may be made as to whether or not frame beams of the cycle frame need to be changed (e.g., replaced, removed, and/or added). If not, then method 500 advances to block 520. Otherwise, method 500 advances to block 515 at which point frame beams can be changed (e.g., replaced, removed, and/or added). At block 520, a determination may be made as to whether plates need to be changed. As noted, at times there may be a need to have plates of different shapes, sizes, and/or for different uses. If no changes are needed, then method 500 advances to block 530. Otherwise, method 500 advances to block 525, at which point plates are changed. At block 530, a determination is made as to whether or not components (e.g., seat component 216) are to be changed. If not, then method 500 advances to block 540. Otherwise, method 500 advances to block 535, at which point the components can be changed. It is noted that as referred to herein "changing" with respect to blocks 515, 525, and/or 535 may include (but is not limited to) changing an angle with respect to the plurality of frame beams, a distance to a bottom of the cycle frame, a distance to another component, or a combination thereof. At block 540, frame beams are re-secured to plates using fasteners.

It is noted that adjustments to a cycle frame can also include altering a frame for storage (e.g., folding elements and components to hang from hooks, folding elements and components to fit in compartments, etc.).

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second'" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A cycle frame comprising:
a first set of plates and a second set of plates; and
a plurality of frame beams attached between the first set of plates using removable fasteners;
wherein the first set of plates are arranged to receive a handlebar component, a first frame beam of the plurality of frame beams and a second frame beam of the plurality of frame beams;
wherein the second set of plates are to receive the first frame beam and the second frame beam of the plurality of frame beams; and
a crank component and a seat component are connected to the second set of plates, the first frame beam, the second frame beam, or a combination thereof.

2. The cycle frame of claim 1, wherein the first set of plates comprise substantially parallel plates.

3. The cycle frame of claim 1, wherein the first set of plates comprise a plurality of apertures to correspond to apertures in the plurality of frame beams.

4. The cycle frame of claim 3, wherein the plurality of apertures of the first set of plates are arranged to attach the plurality of frame beams at a plurality of different angles with respect to each other.

5. The cycle frame of claim 1, wherein the seat component is connected to the first frame beam.

6. The cycle frame of claim 5, wherein the crank component is connected to the second frame beam.

7. The cycle frame of claim 1, further comprising a cargo frame connected to the first set of plates, the second set of plates, or a combination thereof.

8. A method of assembling a cycle frame, the method comprising:
arranging a plurality of frame beams comprising apertures between a set of plates having corresponding apertures;
using a plurality of removable fasteners, securing the plurality of frame beams between the set of plates;
removing the plurality of fasteners between the set of plates;
replacing at least one frame beam corresponding to the plurality of frame beams to yield an updated plurality of frame beams; and
resecuring frame beam ends of the updated plurality of frame beams between the set of plates using the plurality of removable fasteners.

9. The method of claim 8 further comprising:
arranging a handlebar component, a fork component, a stay component, or a combination thereof, to brackets between the set of plates to the frame beams, or a combination thereof.

10. The method of claim 8 further comprising:
arranging a cargo frame component between the set of plates.

11. The method of claim 8 further comprising:
removing the plurality of fasteners between the set of plates;
replacing the set of plates with a new set of plates; and securing the plurality of frame beams between the new set of plates.

12. The method of claim 8 further comprising:
changing an arrangement of a handlebar component, a fork component, a seat component, a crank component, or a combination thereof, with respect to the set of plates and the plurality of frame beams.

13. The method of claim 12, wherein the changing of the arrangement comprising changing an angle with respect to the plurality of frame beams, a distance to a bottom of the cycle frame, a distance to another component, or a combination thereof.

14. A cycle comprising:
a first set of plates;
a second set of plates; and
at least a first frame beam and a second frame beam attached directly between the first and the second set of plates with a plurality of removable fasteners, the at least the first frame beam and the second frame beam sandwiched directly between the first set of plates and the second set of plates.

15. The cycle of claim 14 comprising:
a crank attached to the at least the first frame beam;
a seat component attached to the at least the first frame beam; and
a first wheel attached to the first set of plates, and a second wheel attached to the second set of plates.

16. The cycle of claim 14 comprising:
a crank attached to the first set of plates;
a seat component attached to the second set of plates; and
a first wheel attached to the first set of plates and a second wheel attached to the second set of plates.

17. The cycle of claim 14 comprising:
a third set of plates also attached to the at least the first frame beam;
a crank attached to the at least the first frame beam;
a first wheel attached to the third set of plates, and a second wheel attached to the second set of plates; and
a cargo frame connected to the third set of plates.

18. The cycle of claim 14, wherein at least one of the first frame beam or the second frame beam is attached between the first and the second set of plate in a substantially horizontal arrangement.

19. The cycle of claim 18, wherein the first frame beam and the second frame beam are substantially parallel.

20. The cycle of claim 14, wherein a seat component is attached to the first frame beam and not the first set of plates or the second set of plates.

* * * * *